United States Patent [19]

He

[11] Patent Number: 5,734,898
[45] Date of Patent: Mar. 31, 1998

[54] CLIENT-SERVER COMPUTER SYSTEM AND METHOD FOR UPDATING THE CLIENT, SERVER, AND OBJECTS

[75] Inventor: Qianshan He, Tokyo-to, Japan

[73] Assignee: International Business Machines Corporation, Armonk, N.Y.

[21] Appl. No.: 494,458

[22] Filed: Jun. 26, 1995

[30] Foreign Application Priority Data

Jun. 24, 1994 [JP] Japan ..................... 6-142764

[51] Int. Cl.⁶ .................................... G06F 15/16
[52] U.S. Cl. ............... 395/619; 395/468; 395/200.05
[58] Field of Search ....................... 398/425, 601, 398/616–621, 468–472, 200.05

[56] References Cited

U.S. PATENT DOCUMENTS

| | | | |
|---|---|---|---|
| 4,648,036 | 3/1987 | Gallant | 395/619 |
| 4,887,204 | 12/1989 | Johnson et al. | 395/610 |
| 4,897,781 | 1/1990 | Chang et al. | 395/617 |
| 5,202,971 | 4/1993 | Henson et al. | 395/608 |
| 5,261,069 | 11/1993 | Wilkinson et al. | 395/472 |
| 5,287,496 | 2/1994 | Chen et al. | 395/619 |
| 5,452,447 | 9/1995 | Nelson et al. | 395/621 |
| 5,452,448 | 9/1995 | Sakuraba et al. | 395/617 |
| 5,490,270 | 2/1996 | Devarakonda et al. | 395/617 |
| 5,603,024 | 2/1997 | Goldring | 395/619 |

*Primary Examiner*—Christopher B. Shin
*Attorney, Agent, or Firm*—Ronald L. Drumheller

[57] ABSTRACT

Cache updates are made asynchronously between a client and a server in a client server system while the integrity of objects is being maintained, thus avoiding blocked processing at the client, reducing load on communication lines, and enhancing the performance of the whole system. The client, after it has updated an object in its cache, sends the ID and contents of the updated object to the server. Then, the client sets the version of its object to 0, and starts other processing without waiting completion of the update in server. Upon receiving a update request from the client, the server places an update lock on the object and update the object in server cache. Then, the server returns no response to this operation. When the transaction is committed, the server uses the updated contents to update its own disk and sends the version at the server to the client.

17 Claims, 12 Drawing Sheets

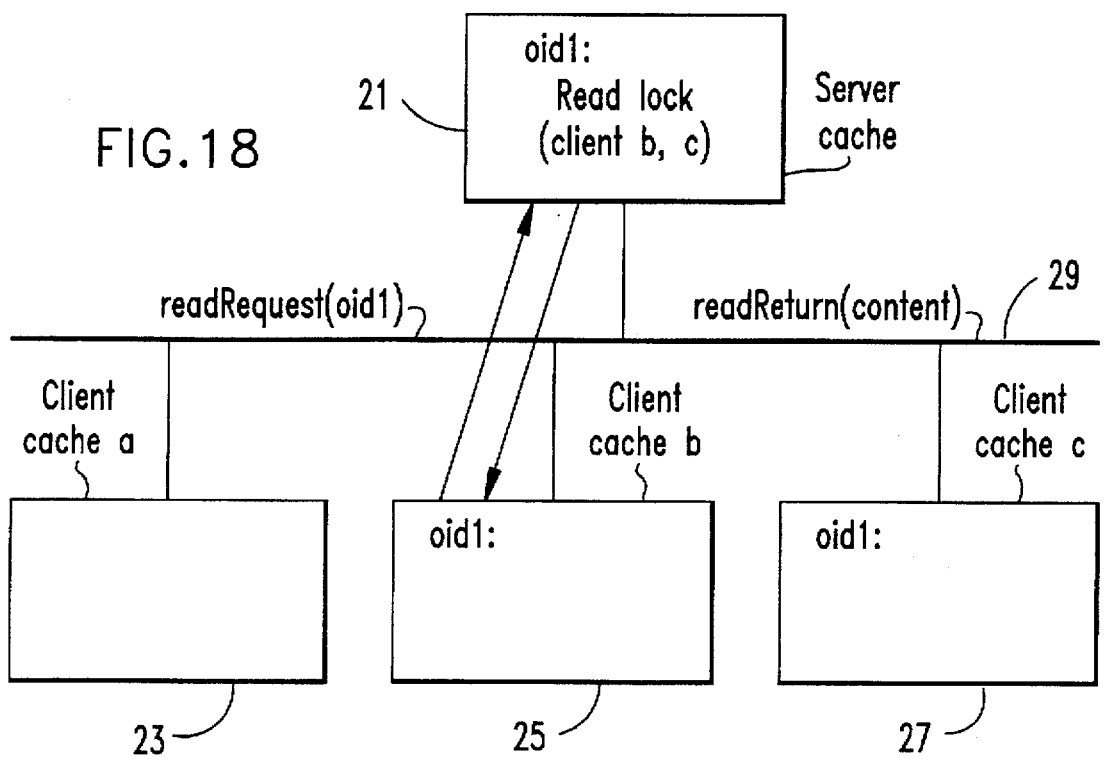
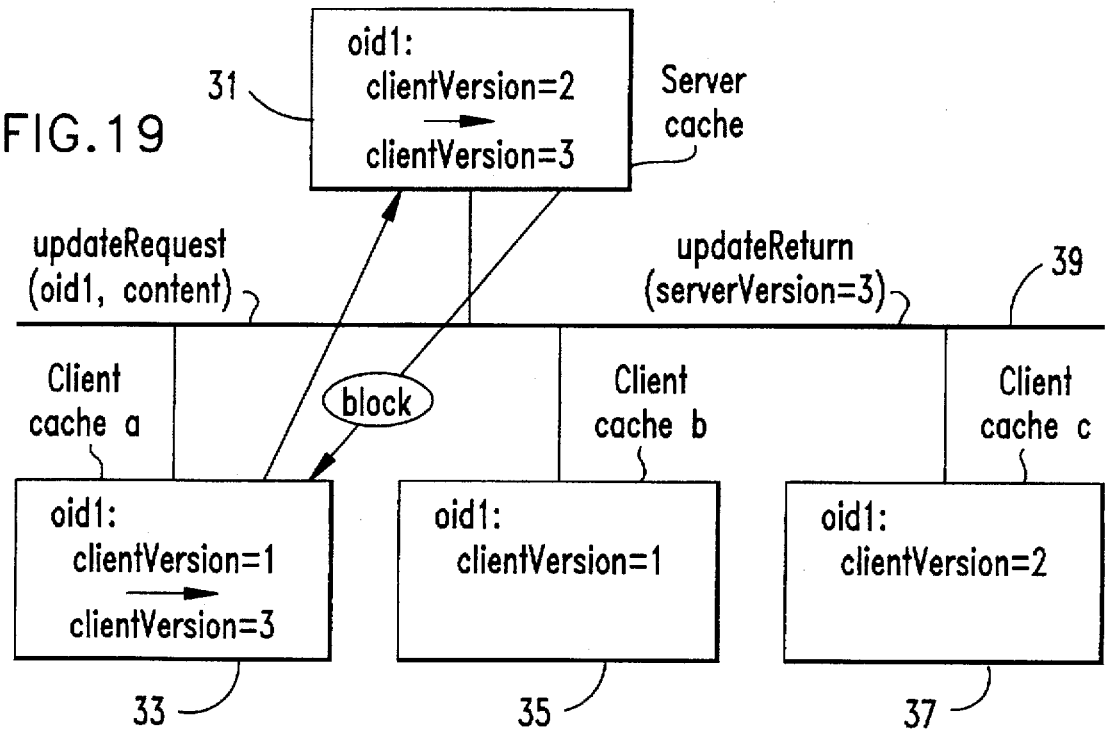

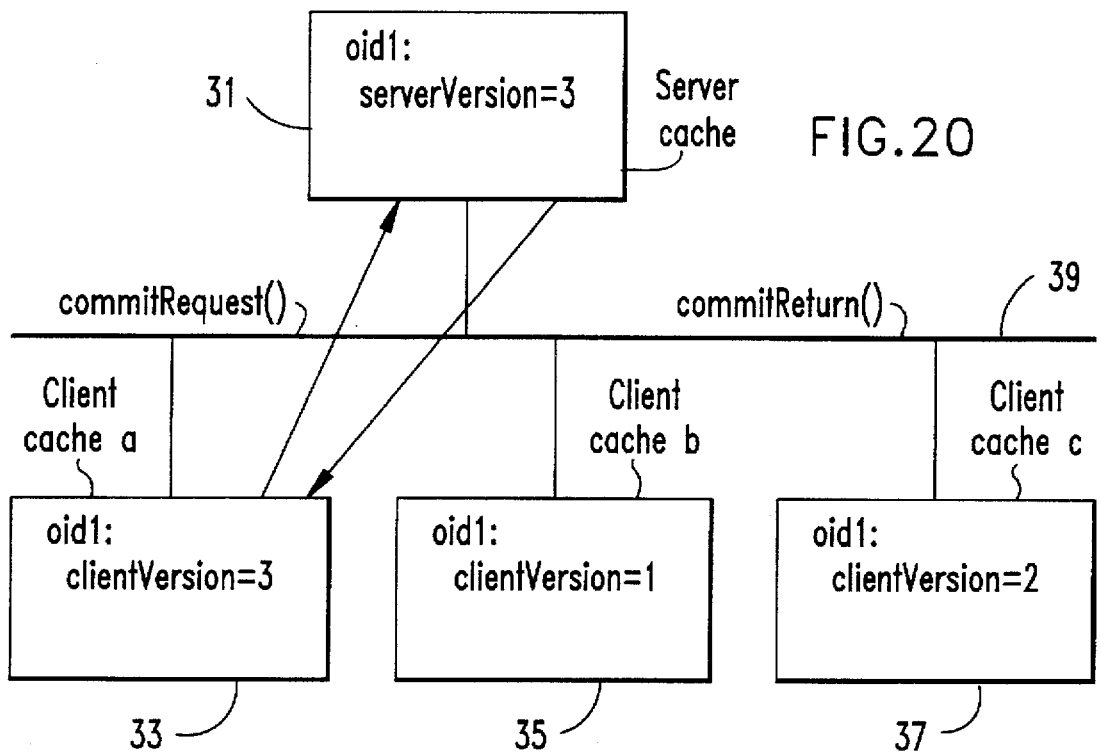
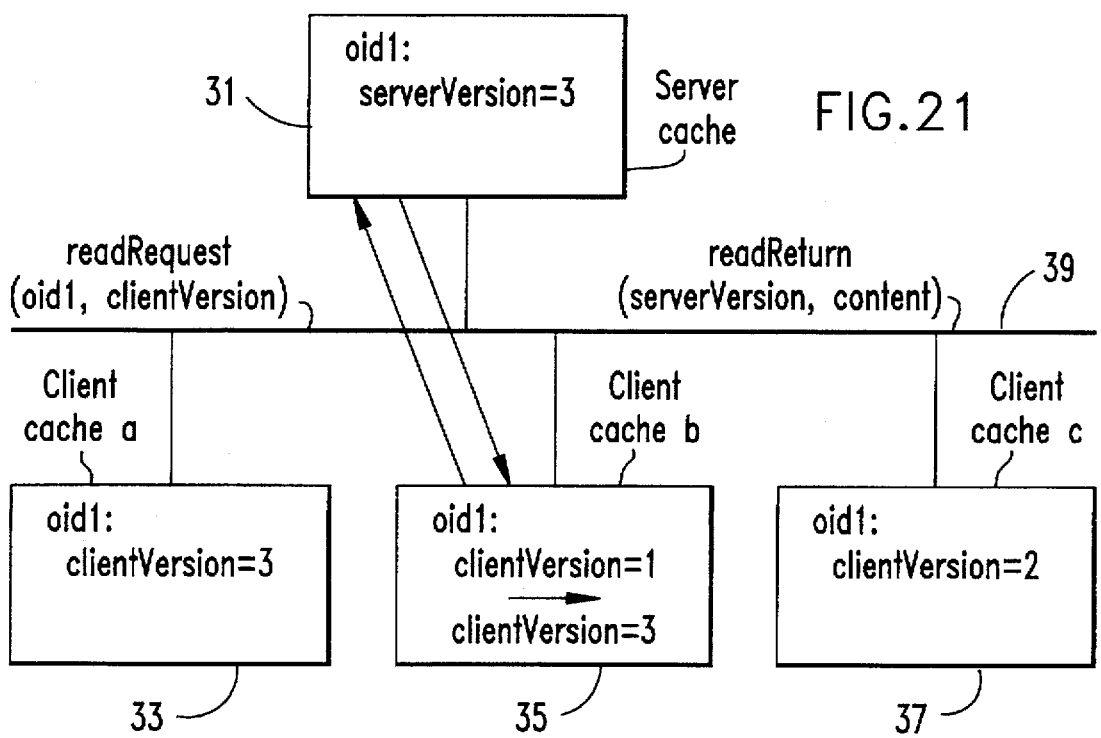

CLIENT-SERVER COMPUTER SYSTEM AND METHOD FOR UPDATING THE CLIENT, SERVER, AND OBJECTS

BACKGROUND OF THE INVENTION

1. Field of the Invention

This invention relates to client server systems (also called client server computer systems), and more particularly, to a method and device for asynchronously updating data in a system including clients and servers each having a cache.

In this invention, the term "object" means what is integrally formed with data and its access means, or data itself (data item).

2. Related Art

As workstations have extended their capabilities, client server systems have been used as effective means for sharing resources residing on the server and services provided by the server. Clients and servers are connected with a communication line such as a local area network (LAN). To use an object stored on a server, a client will read the object from the server through the communication line (network) and process the object. It is thus desirable for each server and client to have a cache to retain objects which they used at an earlier time, for reducing line traffic and disk accesses.

A synchronous or asynchronous method can be used for communication between a client and a server. In the synchronous method, when a source issues a request to a destination, the destination is required to return a response. The source cannot proceed with other processing until it receives the response. In the asynchronous method, on the other hand, when the source issues a request, it can proceed with processing, irrespective of responses from the destination. The synchronous method is advantageous in that it can be confirmed with the response from the destination which has been returned reliably that communication went through to the destination, and in that a relatively simple algorithm can be employed for locking, which is described below. However, since the source cannot proceed with processing until it receives a response from the destination, the synchronous method has the problem that parallelism in processing is restricted and that the requirement of sending responses adds to congestion in the communication line. While the asynchronous method does not incur such problems as of the synchronous method in parallel processing or in line traffic, it is difficult with this method to maintain the integrity of objects in the system. Thus, it has not been easy to employ the asynchronous method in client server systems which perform processing by transactions.

As described above, there has been no effective system using the asynchronous method. Since it is desirable to understand a system which employs the synchronous method in order to understand a system which employs the asynchronous method, a synchronous system will now be described.

FIG. 1 shows a system in which each client and server has a cache. Server 3 and clients A and B (5 and 7) are connected by network 1. Any number of clients may be provided. Server 3 and clients A and B (5 and 7) have caches 11, 13, 15, respectively. Server 3 uses disk drive 17 for storing objects. Server 3 puts the object, which a client requested to read or update (write), into server cache 11, and stores certain objects in server cache 11 for disk 17. "Certain objects" refer to those which have been, for example, updated in a client, transferred, or requested to be update-committed. Object transfer between server cache 11 and disk 17 may be made in various manners, which are different in how to retain objects in cache, what security, backup, and recovery is used, and so on. These manners are not directly related to the present invention and not further described herein.

Server 3 includes lock manager 9. In a client server system, there are cases where a plurality of clients attempt to read or update a same object at the same time. If in such cases read and update operations are accepted at random, it will be difficult to maintain the integrity of objects in the system. In some other occasions where a plurality of clients use a same object at the same time (for read operations), there arises no problem. Lock manager 9 is responsible for managing these concurrent accesses.

There have been proposals of lock algorithms, described below, for the synchronous method. The following description refers to "Data Caching Tradeoffs in Client-Server DBMS Architectures", M. J. Carey et al, Proceedings of the 1991 ACM SIGMOD, pp. 357–366, May 29, 1991. In this description, a transaction consists of one or more operations for reading or updating objects.

(1) Basic 2 Phase Lock (B2PL)

This algorithm uses a shared lock (used for a read operation) and an exclusive lock (write or update lock used for an update operation). A server performs locking. In FIGS. 16 to 18, identical reference numerals are used to illustrate this algorithm. In FIG. 16, server cache 21 and client cache a 23 (cache of client A) contain object oid1. When client A attempts to update object oid1 held in its own cache 23, it sends updateRequest(oid1, content), i.e. object identifier and contents, to the server via communication line 29. The server places a write lock on object oid1 in its cache 21, receives updated contents, and returns updateReturn (OK) for an update request.

FIG. 17 shows the operation of client A requesting the server for committing the update request described above. At this time, client A sends commitRequest( ) to the server. The server unlocks object oid1 in server cache 21 and returns commitReturn(oid1), i.e. object identifier, to client A. Similarly, for abort operation, client A sends abortRequest( ) and the server returns abortReturn(oid1). It should be noted that object oid1 in client cache 23 is discarded when commitReturn(oid1) is received. That is, the object that is cached during the transaction is discarded. This leaves no old objects in the client cache, so the integrity of objects in each cache is maintained. The same object will also be discarded even when it is used immediately after the former transaction. Therefore, in some cases, objects that need not be discarded are discarded anyway. in such cases, read requests must be issued for using the discarded objects. This leads to congestion in communication line 29.

FIG. 18 shows the operation of client B reading object oid1. At this time, client C (having client cache c) has already placed a read lock. Since the read lock is a shared lock, client B can request a read lock. Client B then sends readRequest(oid1), i.e. object identifier, to the server, which in turn places again a read lock on object oid1 and returns readReturn(content) to client B.

Even when only a read operation is performed in the stated processing, there will be a commit or an abort operation finally. in this manner, a lock remains until a commit or abort operation is performed after a read or write operation in a transaction. Since this sequence of operations consists of two phases: a locking phase for reads or writes and an unlocking phase for a commit or an abort, it is called a Two Phase Lock algorithm. By discarding cached objects between transactions, the system can maintain the integrity of the object between transactions, and at the same time concurrent access is permitted.

(2) Cashing 2PL (C2PL)

This algorithm is the same as B2PL in that the server places a shared lock (read lock) or exclusive lock (write or update lock). Unlike B2PL which discards objects in the client cache between transactions, C2PL does not discard objects, but uses a log sequence number for each object at each server and client.

In FIG. 19, the server and clients A to C each contain object oid1 in their respective caches. Respective versions of object oid1 are shown as 2 for the server, 1 for client A, 1 for client B, and 2 for client C. This indicates that client C has done a write operation most recently. If client C then wants to do a write operation to object oid1, it sends updateRequest(oid1, content), i.e. object identifier and contents, to the server via communication line 39. The server then places a write lock on object oid1 and receives the contents being sent. Also the server increments by one the version of its own object oid1 to 3, in this example, and transfers updateReturn(serverVersion=3) to client A. Next, client A updates the version of its own object oid1 to the latest server version, i.e. 3, to complete the update operation. In this technique, although client A retains the up-to-date contents of object oid1, it suffers from the drawback that it cannot perform other operations until it updates the client version upon receiving updateReturn from the server. That is, client A is blocked (see "block" in FIG. 19). Another drawback is that the algorithm causes congestion of the communication line, since updateReturn is necessarily sent through communication line 39.

FIG. 20 shows the operation of client A requesting a commit by the server of the update request described above. Client A sends commitRequest( ) to the server. Then the server returns commitReturn( ). Similarly, for abort operation, an abort request and abort return are transferred. In this case, since the server version and client A version of object oid1 have already been updated to the same, the server will not send a version and other data to client A. This is a waste in terms of the usage of communication line.

FIG. 21 shows the operation of client B reading object oid1. Client B sends readRequest(oid1, clientVersion), i.e. object identifier and client version, to the server since the client version in its cache 35 may not be the latest. The server then places a read lock on object oid1 in server cache 31. Next, the server compares the server version with the client version sent, to determine if they are identical. If so, then the object in the client cache is the latest; it is not necessary to return its contents. However, since this case is different in FIG. 21, cache 35 in client B is not the latest. Thus, the server sends readReturn(serverVersion, content), i.e. server version and contents, to client B, updates the contents of object oid1 in cache 35, and makes its client version the same as the server version.

As described for the B2PL algorithm, since C2PL is also two phase locking, commit or abort processing is required even when a transaction contains only one read operation. This will release all locks a transaction hold.

In this manner, locking and object versions are used for managing the contents of the client cache to insure the integrity of objects and concurrent access.

The methods described above are characterized in that they place importance to the consistency of the contents of each client cache, and first place a lock on the object of the server. These methods are effective when there are many clients, that is, read or write operations are frequent. Comparatively, there are the following methods:

Optimistic 2 Phase Locking (O2PL)

O2PL is different from the 2PL methods mentioned above in that a lock is not placed on a server before committing the transaction, but a read/write lock is placed on a client by the client. That is, a client is optimistic to assume that there will be no lock conflict with other clients, and continues processing up to the commit stage. If it can be confirmed at the commit stage that no lock conflict occurs with other clients during processing, the transaction is successful. If not, the transaction is aborted and all this processing become wasted. In an update operation, for example, the client places a lock on its client cache to do an update operation. Then, at the commit stage, it sends an updated object to the server. Next, the server places an update copy lock (similar to a write lock) on the corresponding object in its cache. Upon obtaining this lock, the server sends a prepare-to-commit message to all other clients which have cached the updated object. These clients place an update copy lock on the updated object in their cache. With all relevant locks obtained, different O2PL methods will then be applied as follows:

(1) Update invalidating O2PL (O2PL-I)

In this method, only the server and the client which requests a commit update their objects. Updated copies of other clients are only marked invalid.

(2) Update Propagating O2PL (O2PL-P)

In this method, an update is propagated to all the clients which possess an updated copy. Thus, these clients have the latest object copies. However, propagation of an object from the client which has made the update to all other clients is wasteful in communication if these objects are not likely to be used at other clients.

(3) Dynamic O2PL (O2PL-D)

This method is an intermediate between methods (1) and (2); if appropriate, cached copies are made invalid, and if propagation is considered to be useful, changes are propagated.

Updating operation without a lock obtained at the server is effective if there are not many transactions, or if there are lesser number of clients, or update operations are not frequent. If this is not the case, even a single lock conflict causes transactions to be aborted and processing to restart from the beginning. Therefore, these methods are rarely used in actual systems.

As we can see above, B2PL, C2PL, and O2PL are for synchronous communication, and thus entail such problems as blocked processing and impaired line traffic.

SUMMARY OF THE INVENTION

Accordingly, one objective of this invention is to solve the problems of synchronous methods described above and provide a high performance, high throughput client server system.

Another objective of this invention is to accommodate a locking system which assures the integrity of objects in a client server system even when the locking system is applied to asynchronous communication.

One more objective of this invention is to reduce latency in processing and load on communication lines, and make the most of the capabilities of the system.

This invention is directed to accomplish the objectives described above, and as a whole is a client server computer system comprising a server, a plurality of clients, and a network connecting between the server and clients. An object to be processed is identified by an identifier (ID) and version value which is an update record of the object. The system is characterized in that each client computer has means for managing a cache and the object version in the cache, means for updating an object in the cache, and means for transmitting the ID of an updated object and its contents, and that the managing means sets the version of an updated object to a predetermined value in response to the transfer means before starting another operation. This allows the client to continue with processing without waiting for the server response.

There may be provided means for receiving from the server the ID and newest version value of the object which has been updated before the transaction is committed and completed, and the managing means may update the version of the updated object to the newest version value being received. In this way, the version values of the server and client will be identical for the same object, and the integrity of the object contents be fully maintained.

Further, there may be provided means for receiving from the server the ID of the object which has been updated before the transaction is aborted and terminated, and means for invalidating the object associated with the ID of the received object. This causes no problem in the integrity of the object contents of the server and client even if their transaction is aborted.

In a similar client server computer system, wherein a server computer comprising means for managing a cache and the object version in the cache, means for receiving from a client the ID and contents of the object which has been updated by the client, and means for placing a write lock on the updated object, if the version management means updates the version of the updated object to the newest value, and includes means for sending to the client the ID and newest version value of the object which has been updated before the transaction is committed and completed, undesired responses will be eliminated and load on the communication line be reduced. The ID and contents of the updated object may be sent together as a unit to the client.

In this regard, even when the server further includes means for discarding the contents of the object which has been updated before the transaction is aborted and terminated, and sending the ID of the updated object, undesired responses are similarly eliminated.

Another aspect of this invention is a client server computer system comprising a server and a plurality of clients each having a cache, and a network connected between the server and clients. Objects to be processed are identified by an identifier (ID) and version value which is a record of object update. This system employs an object updating method which comprises the steps of: updating an object which resides in the cache of a client; passing the ID and contents of the updated object to the server; updating the version of the updated object on the client to a predetermined reserve value in response to the passing step; allowing the client to start other processing in response to the version updating step; receiving at the server the ID and contents of the object which has been updated by the client in response to the passing step; placing a write lock on the updated object at the server; updating the version of the updated object at the server to a newest value; and sending to the client the ID and newest version value of the object which has been updated before the transaction is committed and completed. This allows the client to continue processing without being blocked by waiting for the server response and the server to omit a single response and perform other processing.

In addition, the steps of receiving at the client the ID and the newest version value of the updated object at the server and updating the version of the updated object at the client to the newest version value being received may be carried out to achieve full management of versions in the system.

Further, the step of discarding the contents at the server of the object which has been updated before the transaction is aborted and terminated, and passing the ID of the updated object to the client may be added, to allow the server not to use the updated object more than once.

Moreover, the steps of receiving at the client the ID of the object which has been updated before the transaction is aborted and terminated, and invalidating the object at the client which is associated with the ID of the received object may be carried out to confirm the invalidated object not only at the server but at the client as well.

A further aspect of this invention is a client server computer system similar to the one described above, comprising: means provided in a client for updating an object within the client cache; means provided in the client for transmitting the ID and contents of the updated object to the server; means provided in the client for updating the version of the updated object to a predetermined reserve value in response to the transfer; means for allowing the client to start other processing in response to the version update operation; means provided in the server for receiving the ID and contents of the object updated by the client in response to the transfer; means provided in the server for placing a write lock on the object updated at the server; means provided in the server for updating the version at the server of the updated object to the newest value; and means provided in the server for sending to the client the ID and newest version value of the object which has been updated before the transaction is committed and completed. Of these, the transfer means, version update means, updating means, and means for allowing initiation of other processing which are provided in the client reside within the control unit of the client, which will be described in the Description of the Preferred Embodiment. The receiving means, version management means, and sending means provided in the server reside within the control unit of the server, which will also be described in the Description of the Preferred Embodiment.

The sending means provided in the server may discard the contents of any object which has been updated before the transaction is aborted and terminated, and send the ID of the updated object, in order to avoid storing in disk the object which should be invalidated at the server.

There may also be provided means in the client for receiving the ID of the object which has been updated before the transaction is aborted and terminated, and means for invalidating the object on the client which is associated with the ID of the received object, to avoid mismatch between the contents of objects updated at the client and server.

By further providing the client with means for receiving the ID and newest version values of the object which has been updated before the transaction is committed and completed and allowing the version update means provided in the client to update the version on the client with the newest version of the updated object, the client can retain the same version as in the server for the updated object.

A still further aspect of this invention is a client server computer system similar to those described above, comprising: means provided in a client for updating an object in the client cache; means for issuing a request for reading a certain object; means provided in the client for transmitting to the server the ID and contents of the updated object or the ID of the object to which a read request has been issued and the version at the client of the object; version management means provided in the client responsive to the transmission of the ID and contents of the object which has been updated for setting the version of the updated object to a predetermined reserve value; and means responsive to the version management means for allowing the client to start other processing if the object update has occurred, or causing the client to halt processing if the read request has been issued.

The system further comprises: means provided in the server responsive to the transfer means provided in the client for receiving the ID and contents of the object being updated by the client, or the ID of the object to which a read request has been raised and the version at the client of the object; lock management means provided in the server for placing a write lock on the object which has been updated, or a read lock on the object to which the read request has been raised; version management means provided in the server for updating the version at the server of the object which has been updated to the newest value, or comparing the transferred version at the client with the version at the server if the read request has been raised; transfer means provided in the server for transmitting from the server the content of the object to which the read request has been raised and the version at the server if the version management means provided in the server determines that the version at the client is older than that at the server, or transmitting the version at the server of the object to which the read request has been raised if otherwise, or transmitting to the client the ID and newest version value of the object which has been updated before the transaction is committed and completed; and reception means provided in the client for receiving the contents of the object to which the read request has been raised and the version at the server in response to the transmission means provided in the server, or receiving the ID and newest version value of the object which has been updated before the transaction is committed and completed. This allows read operations as well.

When an object is updated and the transaction is committed and completed, the version management means provided in the client may update the version of the object at the client with the newest version value received, or if the transaction is aborted and terminated, the transmission means provided in the server may transmit to the client the ID of the object which has been updated before the termination of the transaction, the reception means provided in the client may receive the ID of the updated object, and the version management means provided in the client may invalidate the ID of the updated object. This operation sequence allows the server and client to maintain the integrity of the contents of the object.

When a read request is issued, additional means may be provided which is responsive to the reception means provided in the client for allowing restart of the processing which has halted the object to which the read request has been issued, to proceed to the subsequent processing using the object being read.

BRIEF DESCRIPTION OF THE DRAWINGS

FIG. 18 is a general overview of a read algorithm according to prior art 1.

FIG. 19 is a general overview of an update algorithm according to prior art 2.

FIG. 20 is a general overview of a commit algorithm according to prior art 2.

FIG. 21 is a general overview of an abort algorithm according to prior art 2.

DESCRIPTION OF THE PREFERRED EMBODIMENT

Figure 1:
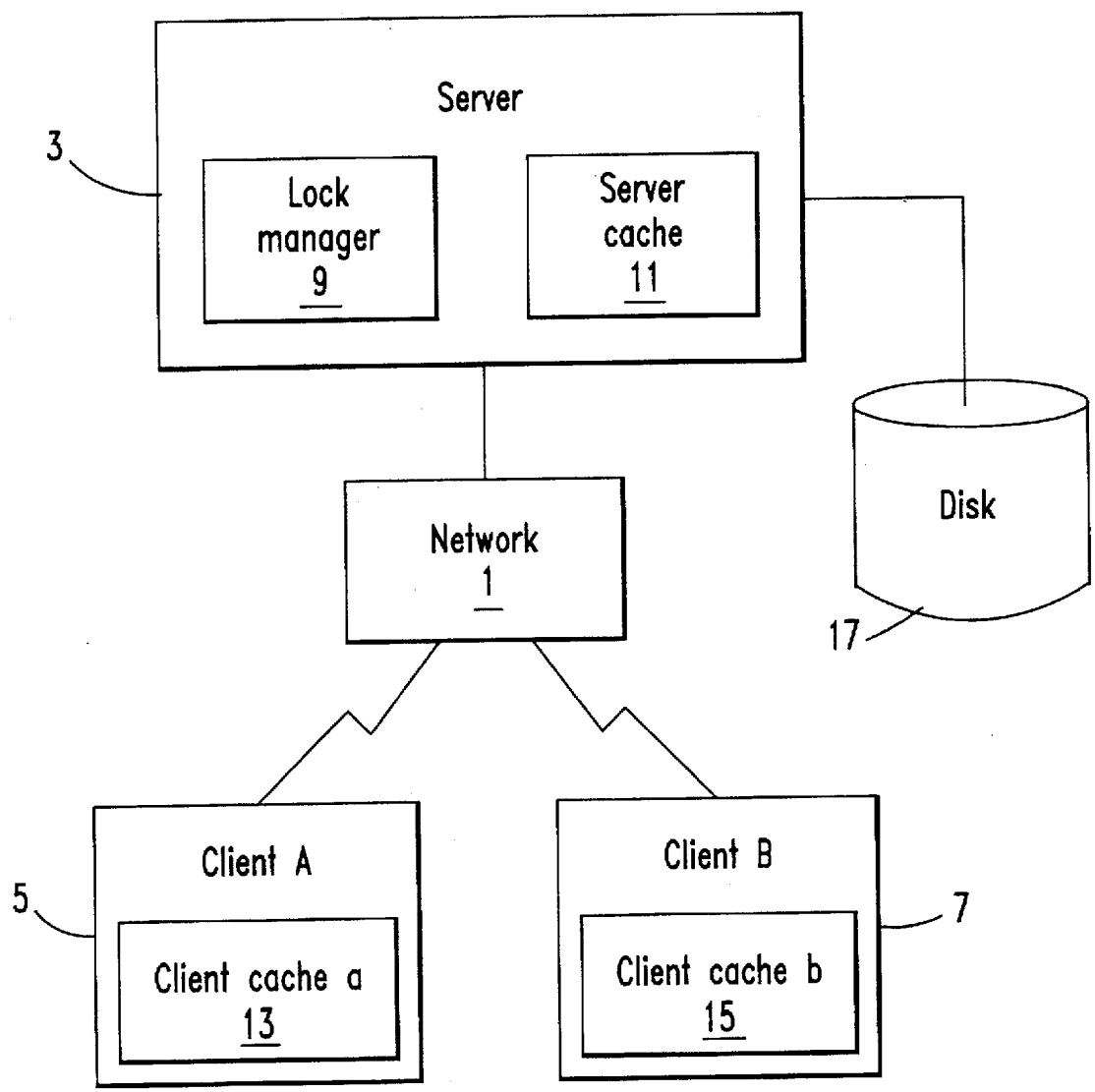
FIG. 1 is an overall block diagram of the present invention and prior art.

The schematic block diagram shown in FIG. 1 may be applied to this invention. However, significant features of the present invention will also be described herein.

It should be understood that if a client has updated an object in server cache 11, the contents of the most recently updated object will not be propagated to another client which has the same object as the updated one. Lock manager 9 of this invention uses essentially a two phase lock algorithm. That is, a lock is maintained until the transaction is committed or aborted. A read lock blocks a write (update) request by another client, and a write lock blocks a read and update lock by another client. In this manner, lock manager 9 serializes concurrent accesses to objects and maintains integrity of object contents.

Client cache 13 or 15 will be updated immediately after a client has updated an object. However, for update operation in server cache 11 and disk 17 connected to server 3, an update request is held in a queue such as FIFO (First-In First-Out) that will be processed one after another when the workload on the processor (not shown) of server 3 is decreased. All update tasks are completed when the transaction is committed.

Figure 2:
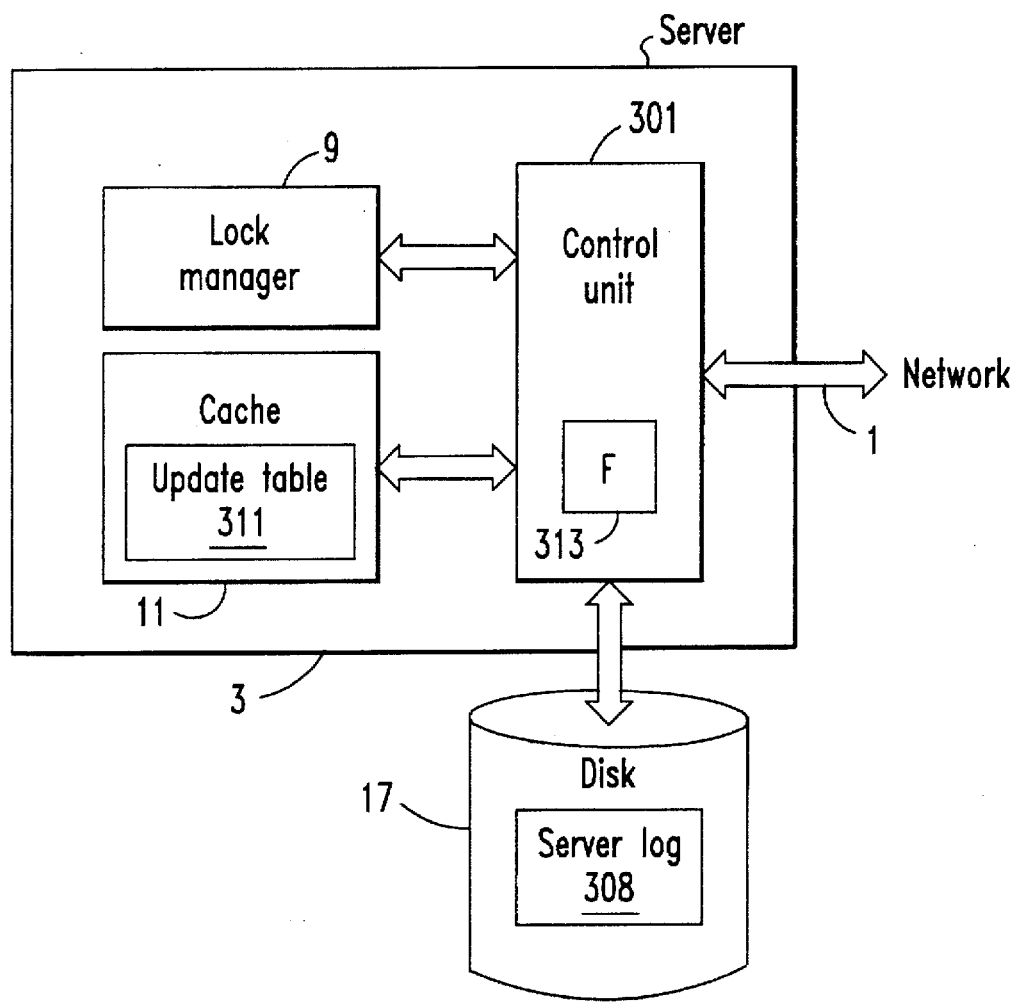
FIG. 2 is a schematic block diagram of a server according to the present invention.

FIG. 2 shows a schematic block diagram of server 3. Server 3 is connected to network 1, and more specifically, control unit 301 is directly connected to network 1. Control unit 301 is connected with lock manager 9, and also connected to cache 11 and disk 17. Control unit 301 contains sendDataFlag 313 (F in FIG. 2). This flag 313 (its details will be later described) is set when in a read algorithm the contents of an object must be sent to a client. Control unit 301 receives various requests and sends various responses to perform operations including object version management, lock requests to the lock manager, transfer of objects in cache and disk. Cache 11 includes update table 311 which stores the IDs of updated objects and their versions. Disk 17 includes server log 309 which retains the contents of updated objects until their transaction is committed. The update table and server log will later be described in detail.

Figure 3:
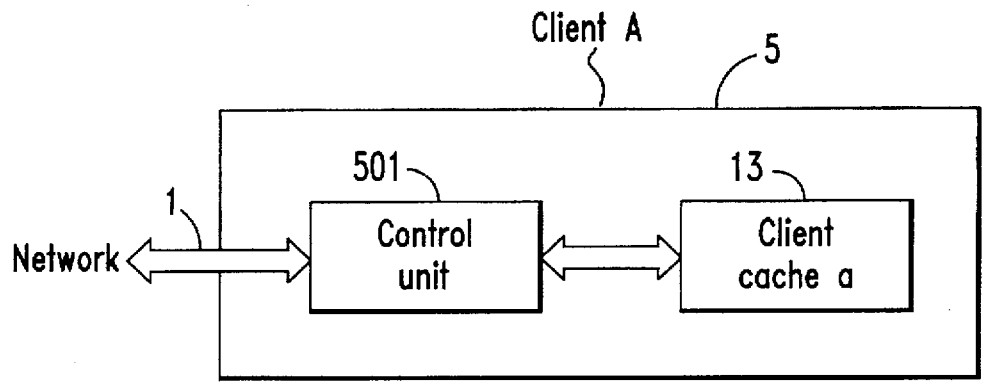
FIG. 3 is a schematic block diagram of a client according to the present invention.

FIG. 3 shows a schematic block diagram of client A (5). Client A is connected to network 1, to which control unit 501 is directly connected. Control unit 501 is responsible for managing the versions of objects in the client, transmitting various requests, and receiving various responses. It also controls the transfer of objects to and from client cache 13 to which it is also connected.

Figure 4:
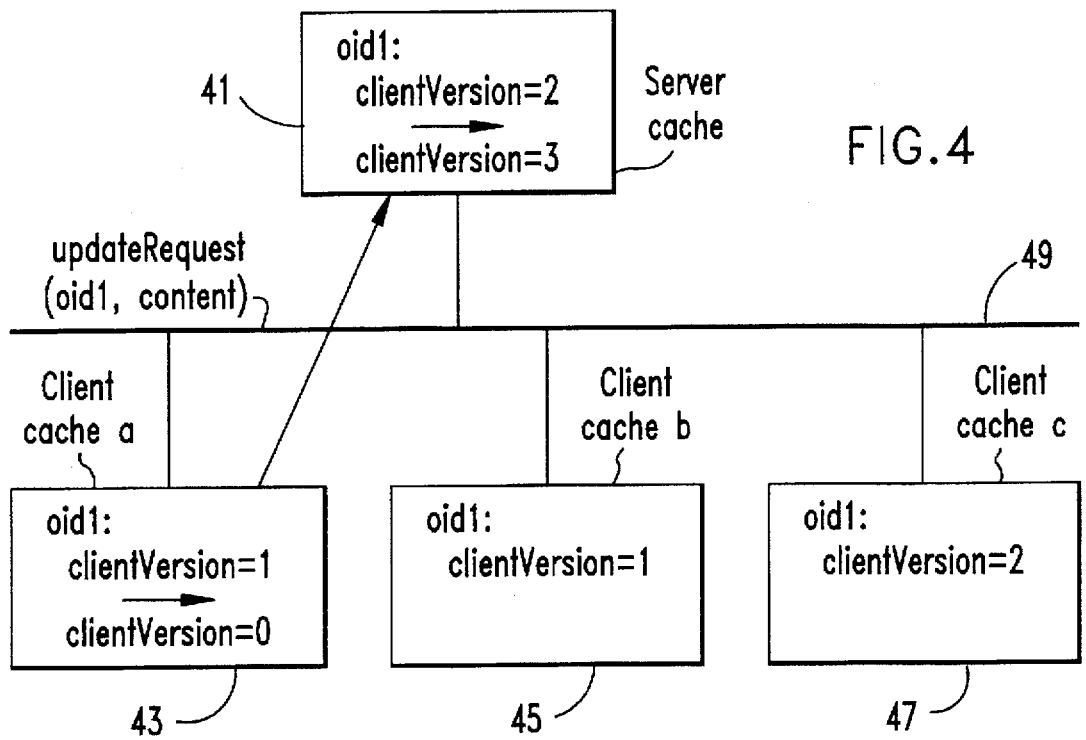
FIG. 4 is a general overview of a write algorithm according to the present invention.

FIG. 4 schematically illustrates an update algorithm. A server and clients A, B, and C are connected with communication line 49, as in the drawing referred to above in the Description of the Prior Art. The object to be updated is object oid1. As in C2PL, this invention uses the version number to keep the integrity of the object contents in the system. Initially, the version of object oid1 in server cache 41 is 2, the version in cache 43 of client A and cache 45 of client B is 1, and the version in cache 47 of client C is 2. Therefore, client C which has the newest version has previously made update processing. Then, when client A tries to update object oid1 contained in cache 43, it sends updateRequest(oid1, content), i.e. object identifier and contents, to the server. Upon sending the update request, client A sets the version of object oid1 in cache 43 to "0", which indicates a version that is not yet committed but the newest. This zeroing of version is one of the significant features of this invention. This allows object oid1 held in client A not to receive the newest version in server cache 41 until the update operation is committed, and to be recognized as the newest. This zeroing does not require the use of "0", but any number or symbol may be used which is not likely to be assigned as any other version number.

Figure 5:
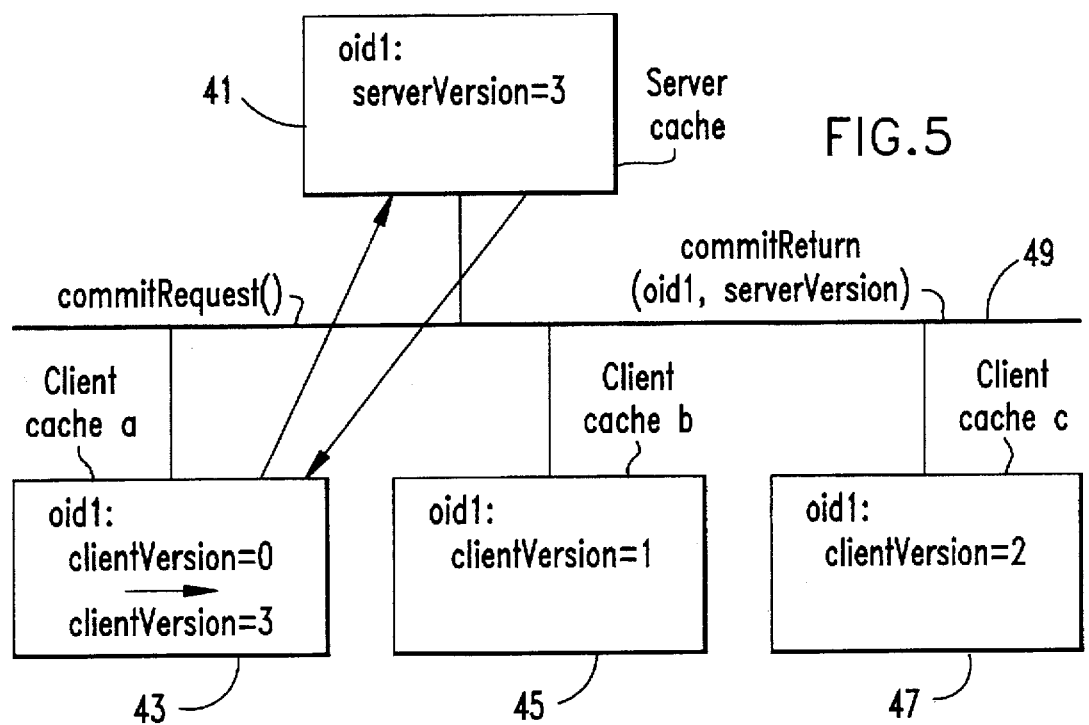
FIG. 5 is a general overview of a commit algorithm according to the present invention.

Upon receiving the update request from client A, the server places an update lock on object oid1 in server cache 41 and receives updated contents. It then increments a version of 2 of object oid1 in server cache 41 to 3. The server does not return requestReturn to client A. This means that update processing can be performed asynchronously; client A can proceed to the next process without waiting for the server to respond. Since the response is not returned, traffic congestion which is otherwise inevitable is avoided in communication line FIG. 5 schematically illustrates a commit algorithm. In FIG. 4, client A has done a write operation to object oid1 in its own cache 43, but which is not committed. Thus, client A sends commitRequest( ) to the server, which in turn releases the update lock on object oid1 in server cache 45 and sends back commitReturn(oid1, serverVersion), i.e. object identifier and server version, to client A. Upon receiving the acknowledgment sent from the server, client A updates the version of object oid1 in its own cache 43 to the same as the server version (3 in this case) to complete committing. The committing in C2PL described above returns commitReturn( ), a commit acknowledgment, but does not send any substantial object. Such meaningless communication can lead to traffic congestion of communication line 49. In addition, data integrity can never be affected even if no acknowledgment is returned for the update request of C2PL described above. In accordance with this invention, both problems of line congestion and client process blocking can be resolved. The abort algorithm, though not described herein, will essentially be carried out in a similar manner. If a number of updates occur in the same transaction, the object ID and corresponding server version are sent together to the client upon committing or aborting.

Figure 6:
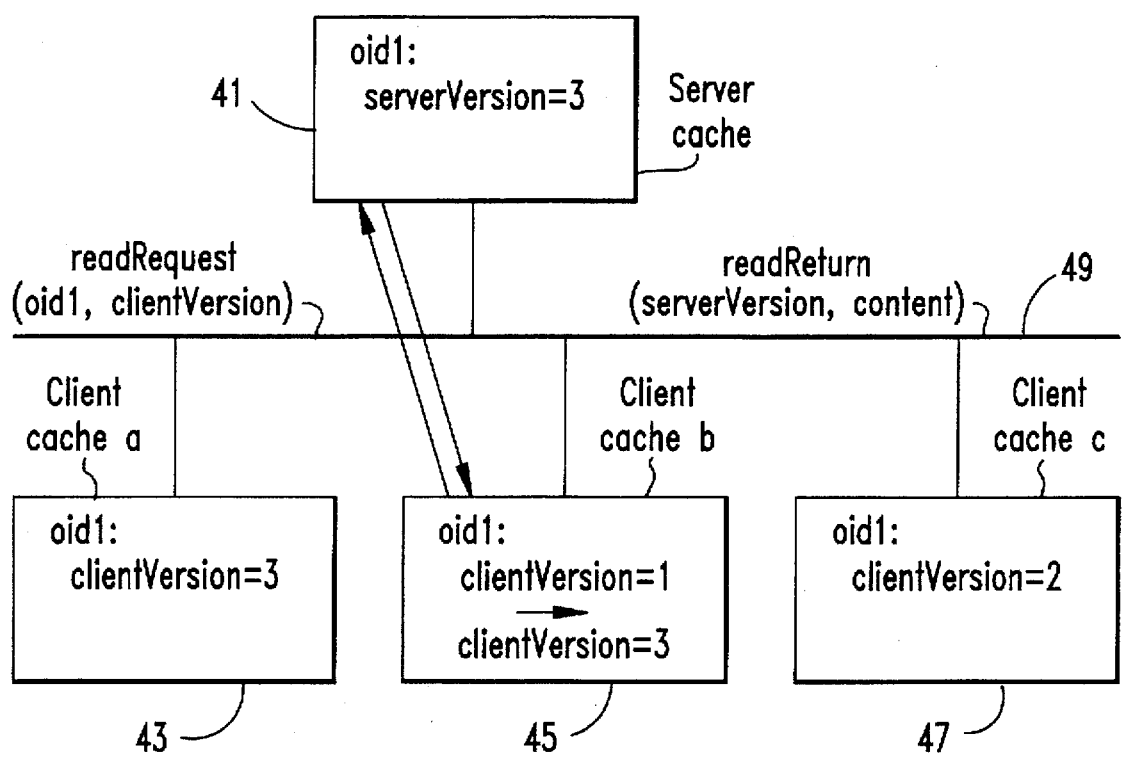
FIG. 6 is a general overview of a read algorithm according to the present invention.

FIG. 6 schematically illustrates a read algorithm in accordance with the present invention. In particular, FIG. 6 shows the operation of client B requesting read operation of object oid1, the operation similar to the read algorithm in C2PL (FIG. 21). Although updating can be asynchronous, reading should be synchronous. We observe that in most applications it is natural to first obtain the required data (that is, to read first), and then perform operations on these data. Without needed data, following operations can not be proceeded. Even only with read operation performed, though not shown, commit or abort processing is required. This is because unlocking is required, as described earlier in the Description of the Prior Art, since the invention employs a basic two-phase locking technique. For the remaining portion of the drawing is similar to the above description and not further described (see FIG. 21).

Referring now to FIGS. 7 to 10, the present invention will be further described in detail.

Figure 7:
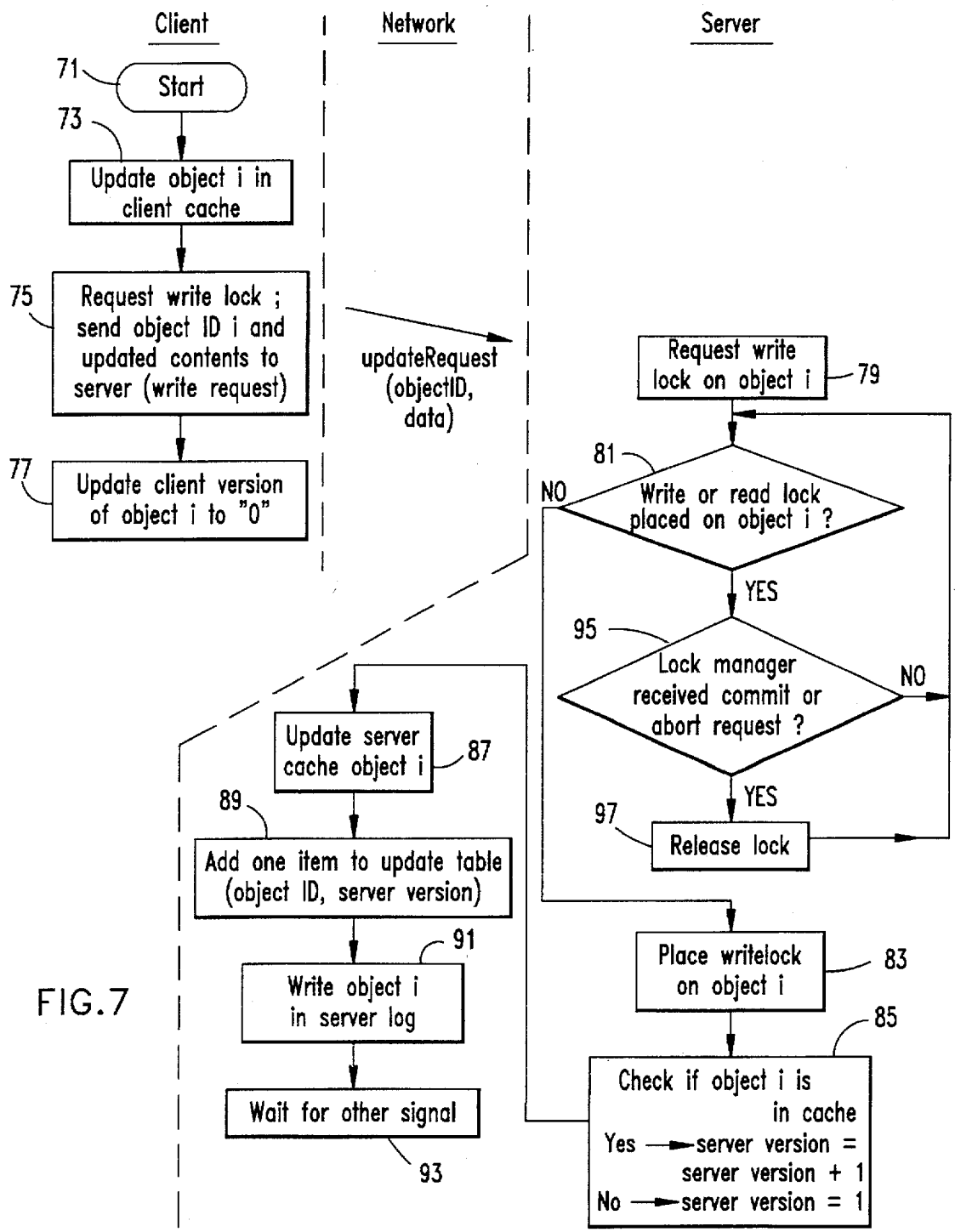
FIG. 7 represents the steps of the write algorithm according to the present invention.

In FIG. 7, updating starts at step 71 of a client. Then, the client does writing in its own cache, at step 73. Thereafter, the client sends updateRequest(objectID, data), parameters of the requesting of a write lock, a object ID (I in this case), and its updated contents, to a server, at step 75. This update request is sent to the server via the network. The client then updates the client version of object I in its cache to "0".

The server requests a write lock for object I in its cache, at step 79, and determines if any write or read lock has been placed on object I by another transaction, at step 81. This check is made because the integrity of object I in the system will be lost if the update request is committed despite a lock being placed. Even with a single lock placed (only a single write lock is acceptable, but there may be a plurality of read locks), this update request will be blocked until the lock is released. Actually, until the lock manager of the server receive a commit or abort request for another transaction (at step 95), the lock will not be released (step 97). If no lock is placed, the server places a write lock on object I, at step 83.

After object I is locked, update requests will be placed in the update queue of the server until the workload on the server processor is lowered. When the workload is lowered, the requests are sequentially taken out, and it is checked if the contents of object I exist in the server cache, at step 85. If they exist in the cache, the server version of object I is incremented by 1 (serverVersion=serverVersion+1). If not, since incrementing by 1 cannot be made, hence serverVersion=1. Thereafter, the server updates object I in the server cache and, if the contents do not exist in the server cache, writes updated contents in the cache.

The server contains an update table for every transaction and adds the object ID and server version relative to an update request to this update table as a new item, at step 89. The server also has a server log for updating the disk contents when a transaction is committed. Then, the server writes the updated contents of object I in the server log, at step 93.

Description of the update algorithm is now substantially complete, but the server operation will continue for update or read requests of the client until the transaction is completed. That is, a number of objects may be updated in a single transaction, or the same object may be updated several times. Further, a number of objects may be read out. Thus, the transaction will continue until the commit or abort algorithm is finished, the commit or abort algorithm will be described below.

Figure 8:
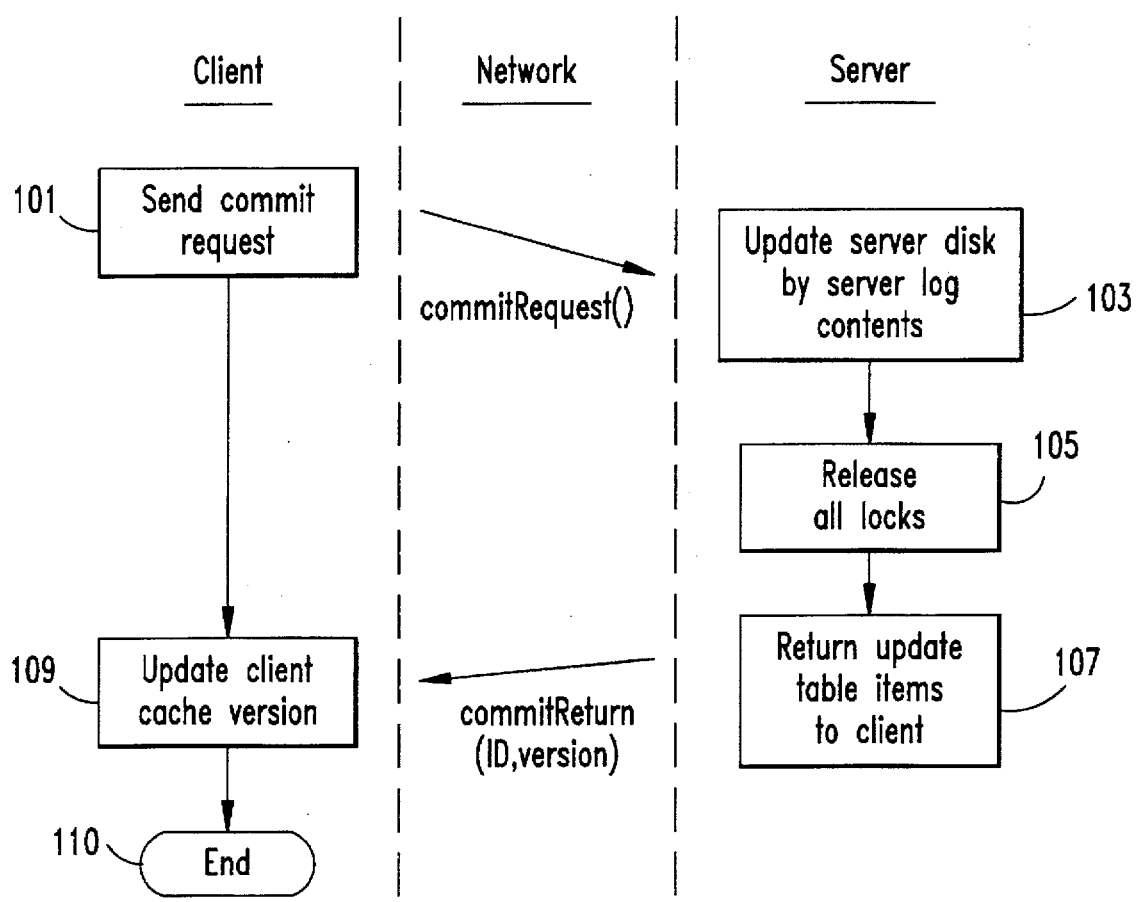
FIG. 8 represents the steps of the commit algorithm according to the present invention.

FIG. 8 shows details of a commit algorithm. A client terminates a transaction in two ways: one in which all processes (updates and reads) in the transaction are treated as effective, the other in which all processes (updates and reads) in the transaction are treated as ineffective. The commit algorithm corresponds to the former.

If the client wishes to treat all processes in a transaction as effective, it sends a commit request to the server, at step 101. The request to be sent via a network is commitRequest( ). The server, upon receiving commitRequest( ), updates the disk by the contents of the server log, used as a backup, at step 103. This is the case only when an update operation has occurred. Thereafter, the server releases all locks placed on objects in committed transactions, at step 105. These locks include both update and read locks. Then the server returns the content of the update table, in which items are added after updating, for updating client versions, at step 107. The contents are sent by commitReturn(ID, version) to the client via the network. The client will use the items in the update table being sent to update the versions of the objects in its cache according to the server versions, at step 109. Then the transaction is ended, at step 110.

Figure 9:
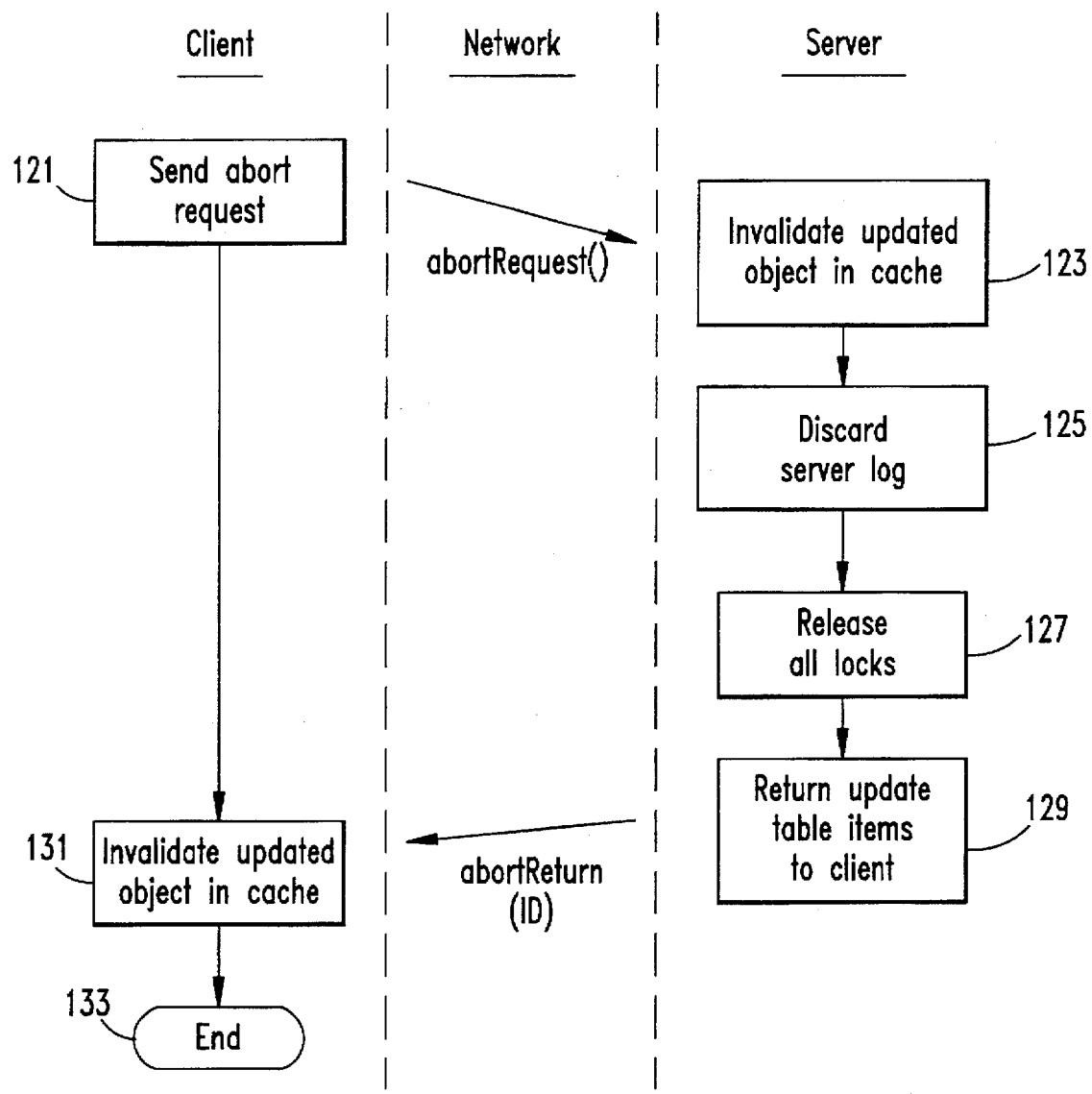
FIG. 9 represents the steps of an abort algorithm according to the present invention.

FIG. 9 shows details of an abort algorithm. When the client must abort transaction processing for some reasons, it sends an abort request to the server (step 121); abortRequest( ) is sent via the network to the server. Upon receiving abortRequest( ), the server examines the update table. If even one item exists in the update table for that transaction, the copy in the server cache of the object for that item is made invalid (step 123). This is because, as described for the update algorithm, the server, if received the update request, would update the cache contents. Then, the server discards the contents of the server log (step 125), since they need not be written in the disk of the server. The transaction will then be complete, so no lock is needed. All write and read locks are released (step 127). As described above, since the contents of the server cache for the object being updated have been invalidated, the corresponding object in the client cache must also be invalidated. Then, the server returns the items of the update table (step 129); abortReturn(ID) is sent to the client, which in turn uses the IDs of objects being sent to find out the updated objects in the client cache and make them invalid (step 131). The transaction is then ended (step 133).

Figure 10:
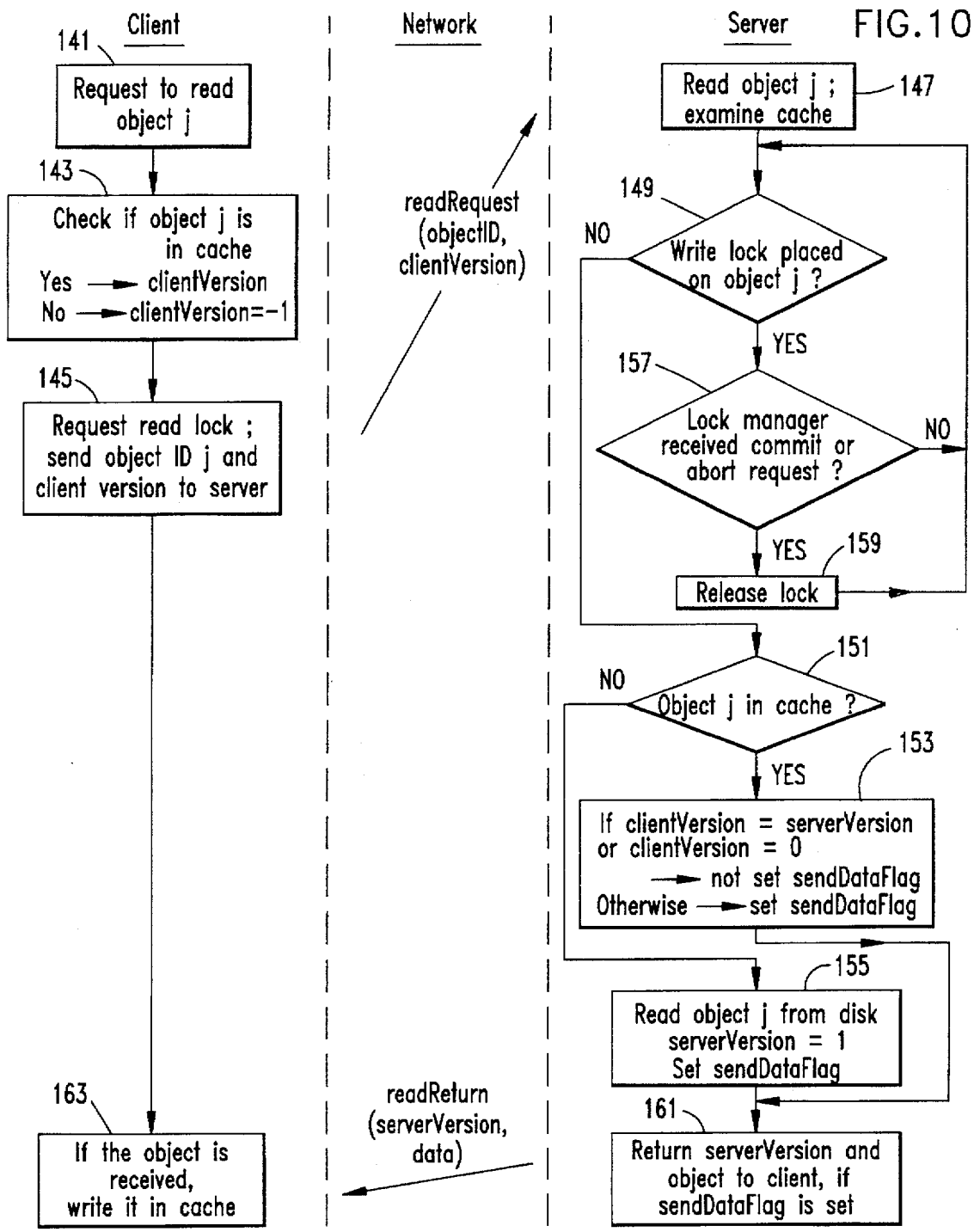
FIG. 10 represents the steps of the read algorithm according to the present invention.

FIG. 10 shows details of a read algorithm. If the client require to read object I in a transaction, it checks to see if object I exists in its cache (step 141). If object I exists in the cache, the client examines the version of object I. If not, the client treats the version of object I as "−1" (step 143), because it must inform that it does not have object I. Typically, the version is incremented by 1, starting from 1. The newest version which is not committed is "0". The version of object I must be other than "0", and may not be "−1", but be any number or symbol which satisfies such requirement.

Next, the client sends a read request with parameters of read lock request, object ID, and client version to server (step 145); readRequest(objectID, clientVersion) is sent to the server via the network. Upon receiving readRequest, the server requests a read lock to object j (step 147). It then examines object j to determine if another transaction has placed a write lock on it (step 149). A read lock does not matter, because it will not affect the integrity of the contents of object j in the system. If a write lock has been placed by a transaction, the lock manager waits for the completion of the transaction (step 157), then the lock is released (step 159).

When the lock is released or no lock has been placed, the server determines whether object j exists in the server cache (step 151). If not, the server reads it from the disk and sets serverVersion to 1. In this case, since it is apparent that the problem of consistency with the client cache does not exist, object j being read from the disk must be sent to the client. Thus, the server sets sendDataFlag to indicate the sending of object j (step 155). If the server cache contains object j, the client version and server version are compared. If they are the same or the client version is "0", then the content of object j is not required to be sent back to the client. Thus sendDataFlag is not set. If not, then there is a difference between the contents of the client cache and server cache. So sendDataFlag is set (step 153). If the sendDataFlag is set in the server, sends the contents of object j (step 161).

At this time, readReturn(serverVersion, data) is sent to the client, which then uses the contents of object j, if they have been sent, to update its own cache and the client version to the server version. If not, then object j in its cache is the newest, which will be used for processing (step 163).

Figure 11:
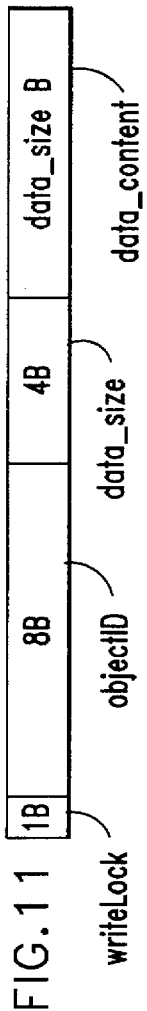
FIG. 11 shows the data format of updateRequest according to the present invention.

FIG. 11 shows the data format of updateRequest (objectID, data); "data" denotes the contents of the object. As described above, this updateRequest is the one to be sent by the client to the server for requesting an update. The update request contains a request of one-byte writeLock at the beginning of updateRequest, followed by objectID of eight bytes. These fields are followed by four-byte data_size indicating the data size of the updated object, and the updated contents of data_content of data_size bytes. In updateRequest(objectID, data), "data" consists of data_size and data_content. These fields are sufficient for the update request.

Figure 12:
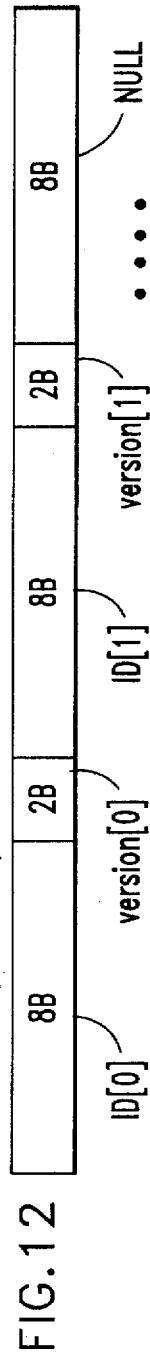
FIG. 12 shows the data format of commitReturn according to the present invention.

FIG. 12 shows the data format of commitReturn(ID, version). This commitReturn is the one to be sent by the server to the client in response to commitRequest( ), and includes the contents of the update table. This update table may contain a plurality of items. Thus, the format includes a number of eight-byte object IDs and two-byte server versions, the number equivalent to the number of items in the update table. At the end of the format, an eight-byte NULL field is appended to indicate the end of the table.

Figure 13:
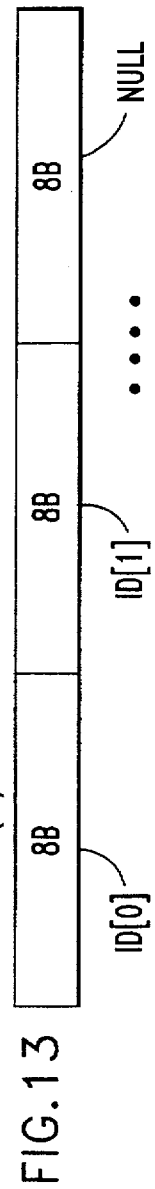
FIG. 13 shows the data format of abortReturn according to the present invention.

FIG. 13 shows the data format of abortReturn(ID). This abortReturn is the one to be sent by the server to the client in response to abortRequest, and includes the contents of the update table. However, since abortReturn is required actually to invalidate the updated objects in the client cache, no server version is needed, only the object IDs within the update table are required. To indicate the end of the table, an eight-byte NULL field is appended.

Figure 14:
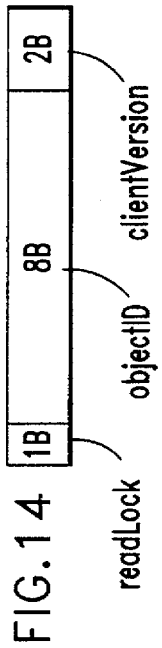
FIG. 14 shows the data format of readRequest according to the present invention.

FIG. 14 shows the data format of readRequest(objectID, clientVersion). This readRequest is to be sent by the client to the server when the client issues a read request. Since issuing a read request requires a read lock, the format includes a field of one-byte read lock request which is followed by the ID (eight bytes) of the object to be read. Also a field of clientVersion is included for the comparison of the client and server versions.

Figure 15:
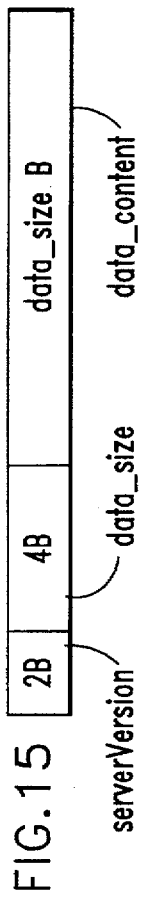
FIG. 15 shows the data format of readReturn according to the present invention.
Figure 16:
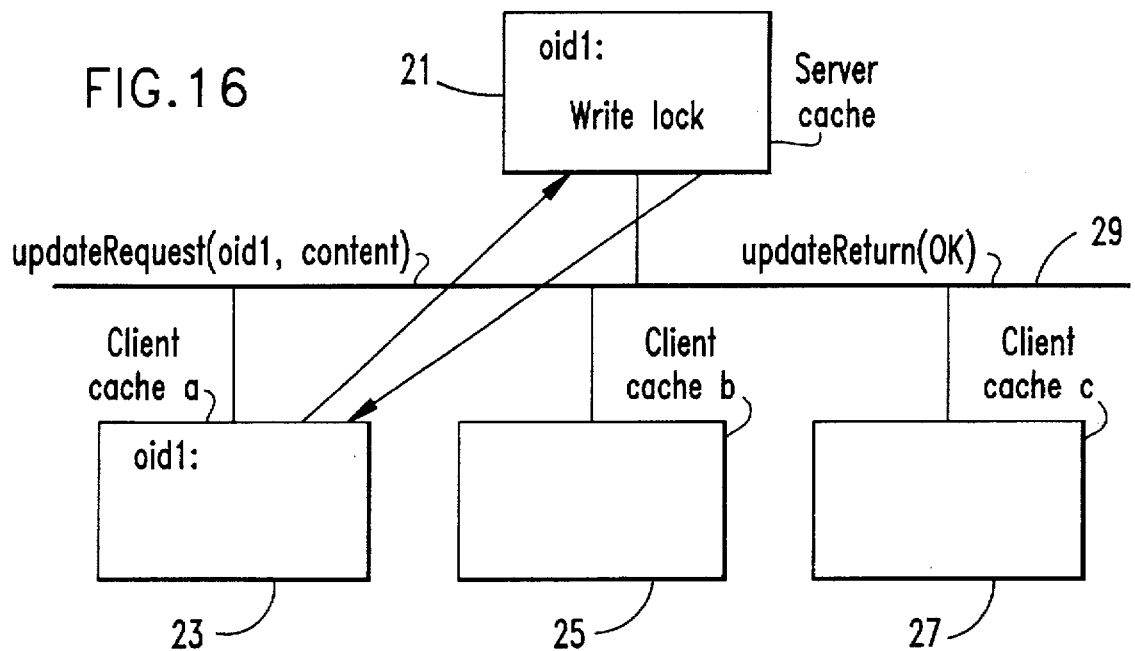
FIG. 16 is a general overview of an update algorithm according to prior art 1.
Figure 17:
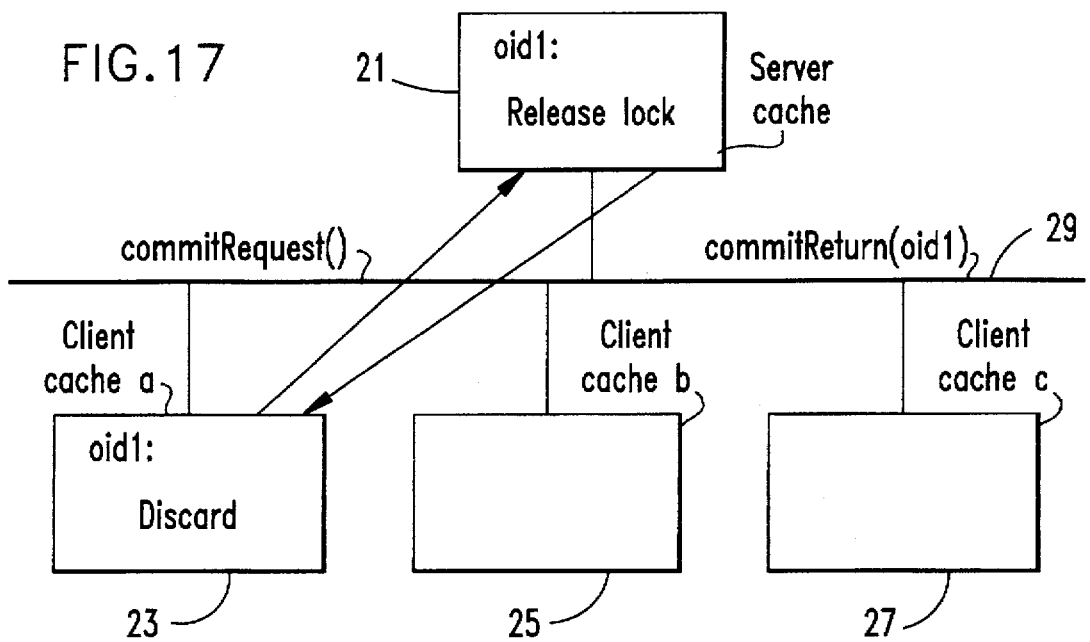
FIG. 17 is a general overview of a commit algorithm according to prior art 1.

FIG. 15 shows the data format of readReturn (serverVersion,data). This readReturn is sent by the server in response to readRequest from the client. A field of two bytes for serverVersion is provided since the version in the client cache must be updated with the server version. However, if the client version is the same as the server version (i.e. the client version is the most recent), no update will be done. There then follows fields of four bytes for data_size indicating the data size of read object, and data_size bytes for data_content which contains the contents of the data. If the client version is found to be the latest, then the object contents need not be sent from the server to the client. In such case, only the server version is transferred. The field of "data" in readReturn consists of data_size and data_content.

At the beginning of data formats of updateRequest, commitReturn, abortReturn, readRequest, and readReturn, bits are added to identify respective Requests and Returns. These bits differ with implementations and involve various methods. For example, these bits are used to stand for a number, and a number is correspondence to a Request or a Return. These methods, however, do not constitute the principal portion of the present invention and not further described. Since other data formats of commitReturn and abortReturn to which the above description is not applicable contain no data but only bit strings for identifying them, their drawings are omitted.

The present invention has been described with reference to a preferred embodiment, it will be understood that various changes in structure may be made. For example, object versioning, especially zeroing of the client version for updating and setting the client version to "–1" for reading is required only to be distinguished from other version numbers. Though versions have been numbered in an ascending order, they may be numbered in a descending order starting from a certain value. Furthermore, the number of clients and servers are not limited, and the types of network is selectable. If a plurality of servers are to be used, i.e. for multiserver environments, efficiency will be further enhanced, since a single client is able to make updates in parallel with a number of servers without blocking. In such cases, the performance of the whole system will increase, since a plurality of servers perform operations in parallel.

As described above, the present invention has provided a high performance, high throughput client server system by eliminating the aforementioned drawbacks of synchronous methods.

The present invention has made it possible to accommodate in a client server system with a lock manager which guarantees consistency even when asynchronous communication is used.

Moreover, the present invention has decreased latency in processing and load on communication lines, and made the most of the capabilities of the system.

A typical application of the invention will be databases. However, the invention is not limited to this application, but to any client server system that performs processing on transaction basis. It is contemplated that such extensive applications are considered to be one of the features of the invention. One of exemplary implementations of the invention is a system which updates a plurality of replica servers (those having copies of the same object) in parallel. Since replica servers are reliable, by duplication and allow fast access by the use of local copies, they have been widely used in actual systems.

I claim:

1. A client server computer system comprising a server and a plurality of clients, each having a cache, and a network connecting said server and said clients, wherein an object to be processed is identified by its identifier (ID) and its version value which is an update record of the object, the system comprising:

means provided in said client for updating the object in said cache in said client without first obtaining a lock from the server;

means for issuing a request for reading the object;

means provided in said client for transmitting to the server the ID and contents of the updated object upon updating thereof or the ID of said object to which the read request has been issued and the version value, held at the client, of said object;

version management means provided in said client for setting, in response to the transmitting of said ID and contents of the updated object, the version value of said updated object to a predetermined value, said predetermined value indicating that said updated object has been most recently updated in a current transaction at said client and has not yet been committed;

means for allowing said client to start other processing in response to said version management means setting the version value of the object to said predetermined value if the object has been updated, or having said client stop processing if the read request has been issued;

reception means provided in said server responsive to said transmitting means provided in said client, for receiving said ID and contents of the object updated by said client, or said ID of the object for which the read request has been issued and its version value, held at the client, of the object;

lock management means provided in said server for placing a write lock on said updated object, or a read lock on said object to which the read request has been raised;

version management means provided in said server for updating the version value, held at the server, of said updated object to a latest version value, or comparing said transmitted version value of said object at the client with said version value of said object at the server;

means provided in said server for sending from said server the contents and said version value of said object to which the read request has been issued if it is determined by said version management means provided in said server that said version value of said object at the client is older than said version value of said object at the server, or sending said version value, at the server, of the object to which the read request has been issued otherwise, means provided in said server for sending to the client the latest version value of the object which has been updated in the event the current transaction is committed and ended; and means provided in said client responsive to said sending means provided in said server, for receiving the contents of said object for which the read request has been issued and said version value thereof held at the server, and receiving the ID and latest version value of said object which has been updated if and when the current transaction is committed and completed.

2. The client-server computer system recited in claim 1, characterized in that said version management means provided in said client updates said version value of the updated object at said client to said latest version value upon receipt thereof if and when the current transaction has been committed and completed.

3. The client server computer system recited in claim 1, characterized in that said sending means provided in said server sends to the client the ID of the object which has been updated in the event the current transaction is aborted and ended, said receiving means provided in said client receives said ID of the updated object in the event the current transaction is aborted, and said version management means provided in said client invalidates said object associated with said ID being received in the event the current transaction is aborted.

4. The client server computer system recited in claim 1, further comprising means for allowing the client to restart said halted processing upon receiving a response from the server to said read request.

5. In a client server computer system including a server, a plurality of clients, and a network connecting said server and said clients, wherein an object for processing is identified with an object identifier (ID) and a version value, a client computer comprising:

a client cache for storing objects received from the server;

means for updating any said object in the client cache without first obtaining a lock from the server;

means for sending said ID and updated content of said any updated object to said server upon updating thereof; and version control means for changing the version value of said any updated object to a predetermined value in response to said means for sending, said predetermined value indicating that said any updated object has been most recently updated in a current transaction and has not yet been committed, wherein the client may immediately continue processing after said changing of the version value to said predetermined value without waiting for a reply from the server.

6. The client computer recited in claim 5, further comprising means for receiving from said server the ID and latest version value of any objects in the client cache which have been updated by said client during the current transaction if and when the current transaction is committed and completed, and wherein said version control means updates the version value of said any updated object to said latest version value thereof received by said receiving means if and when the current transaction is committed.

7. The client computer recited in claim 5, further comprising means for receiving from said server the ID of any object in the client cache which has been updated by said client if and when the current transaction is aborted and ended, and means for invalidating in the client cache said any object associated with said ID being received.

8. In a client server computer system including a server, a plurality of clients, and a network connecting said server and said clients, wherein an object for processing is identified with an object identifier (ID) and a version value, a server computer comprising:

a server cache;

a version control means for controlling said version value for each object in said server cache;

receiving means for receiving said ID and contents of said objects updated by said clients from said clients; and lock means for performing write locks for said updated objects, wherein said version control means updates versions of said updated objects to newest values but does not acknowledge receipt of said updated objects upon receipt thereof nor the performing of said write locks by said lock means, and the server computer further comprises means for sending an ID and said newest version values of objects updated by a client in a current transaction if and when said current transaction is committed and ended.

9. The server computer recited in claim 8, further comprising means for discarding the contents of any object which has been updated by a client during a current transaction if and when the current transaction is aborted and ended by said client, and sending to said client the ID of said any updated object if and when said client aborts the current transaction.

10. In a client server computer system including a server and a plurality of clients, each having a cache, and a network connecting said server and said clients, wherein an object for processing is identified with its object identifier (ID) and its version value, a method for updating the objects in said system, comprising the steps of:

updating an object stored in said cache of a client without first obtaining a lock from the server;

sending the ID and a content of said updated object to the server upon update thereof;

updating the version value of the updated object stored at the client to a predetermined value in response to the step of sending the ID and a content to the server, the predetermined value indicating that said updated object has been most recently updated in a current transaction and has not yet been committed;

starting other processing at the client in response to the step of updating the version value without waiting for a reply from the server;

receiving the ID and the content of said object updated by the client at the server and storing said updated object at the server in response to the step of sending the ID and a content but not acknowledging receipt thereof to the client;

performing a write lock to said updated object stored at the server but not acknowledging said performing of a write lock to the client;

updating the version value of said updated object stored at the server to a newest value; and sending the ID and said newest version value of said updated object to said client if and when said transaction is committed and ended.

11. The object updating method recited in claim 10, further comprising the steps of:

receiving at said client said ID and latest version value of the updated object at said server at the time of committing the current transaction; and updating said version value of the updated object at said client to said latest version value being received at the time of committing the current transaction.

12. The object updating method recited in claim 10, further comprising the steps of discarding the contents of the object which has been updated in the event the current transaction is aborted and ended, and sending the ID of said updated object to said client in the event said current transaction is aborted.

13. The object updating method recited in claim 12, further comprising the steps of:

receiving at said client the ID of the object which has been updated in the event the current transaction is aborted and ended; and invalidating said updated object stored at said client which is associated with said ID being received in the event the current transaction is aborted.

14. A client server computer system comprising a server and a plurality of clients, each having a cache, and a network connecting said server and said clients, wherein an object to be processed is identified by its identifier (ID) and its version value which is an update record of the object, the system comprising:

means provided in said client for updating the object in said cache in said client without first obtaining a lock from the server;

means provided in said client for transmitting the ID and contents of said object being updated to the server upon updating thereof;

version updating means provided in said client for setting, in response to said transmitting means, the version value of said updated object at said client to a predetermined value, said predetermined value indicating that said updated object has been most recently updated ID a current transaction by said client and has not yet been committed;

means for allowing said client to start other processing in response to said version updating means setting the version value of said updated object to said predetermined value without waiting for a reply from the server;

means provided in said server for receiving, in response to said transmitting means, said ID and contents of the object updated by said client;

lock management means provided in said server for placing a write lock on said updated object received at the server without acknowledging said write lock to said client;

version management means provided in said server for updating the version value of the updated object held at the server to a latest value; and means provided in said server for sending to said client the ID and latest version value of the object which has been updated if and when the current transaction is committed and completed.

15. The client server computer system recited in claim 14, characterized in that said sending means provided in the server discards the contents of the object which has been updated in the event the current transaction is aborted and ended, and sends the ID of said updated object to said client in the event the current transaction is aborted.

16. The client server computer system recited in claim 15, further comprising:

means provided in said client for receiving the ID of the object which has been updated in the event the current transaction is aborted and ended; and means provided in said client for invalidating the object in said client which is associated with said ID being received in the event the current transaction is aborted.

17. The client server computer system recited in claim 14, characterized in that the system further comprising means provided in said client for receiving the ID and latest version value of the object which has been updated in the event the current transaction is committed and completed, and that said version updating means provided in said client updates said version value in said client with said latest value of the updated object received in the event the current transaction is committed.

* * * * *